INVENTOR
RUSSELL J. WITTMER.
BY
ATTORNEYS

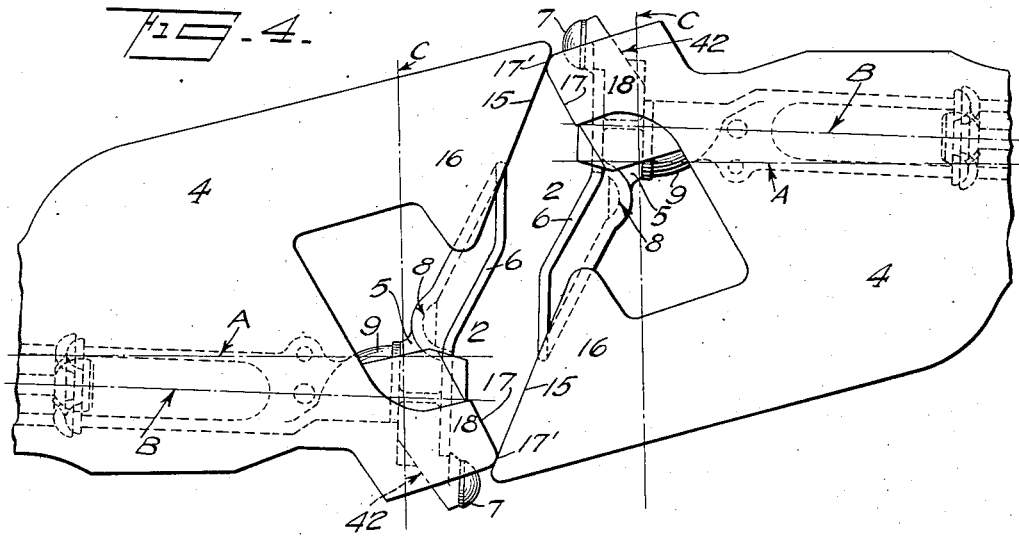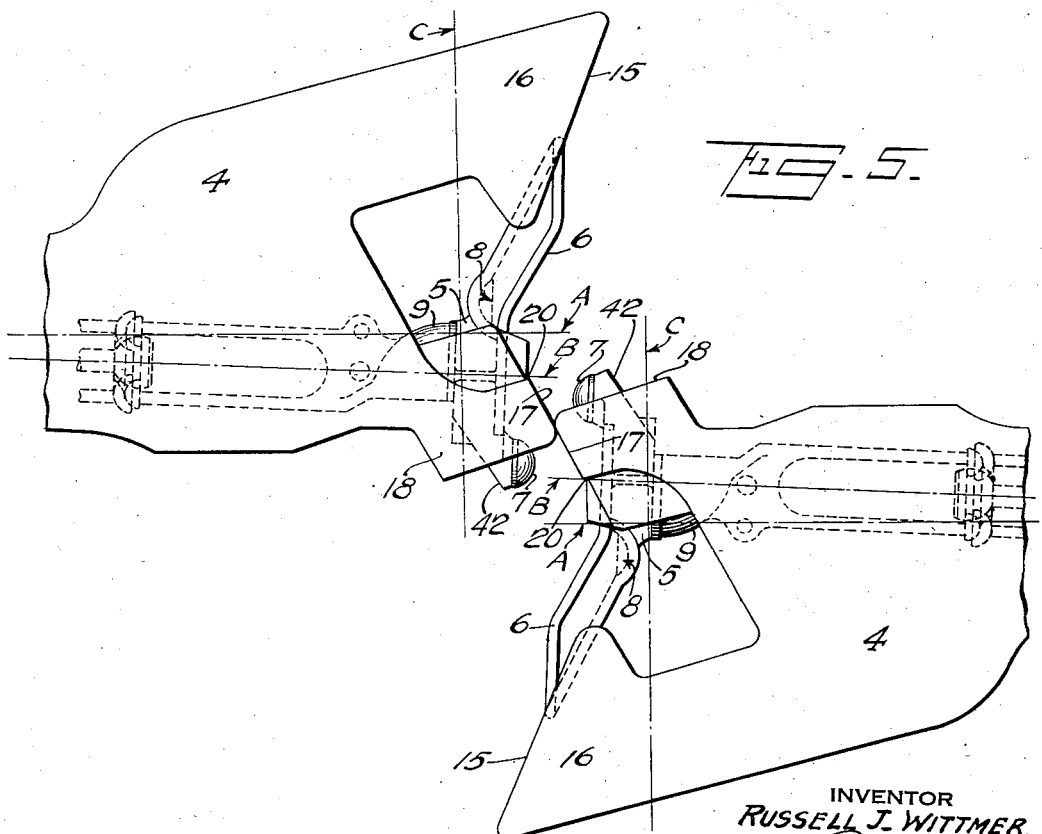

May 19, 1936.  R. J. WITTMER  2,040,968
AUTOMATIC TRAIN PIPE CONNECTER
Original Filed Jan. 12, 1932  7 Sheets-Sheet 4
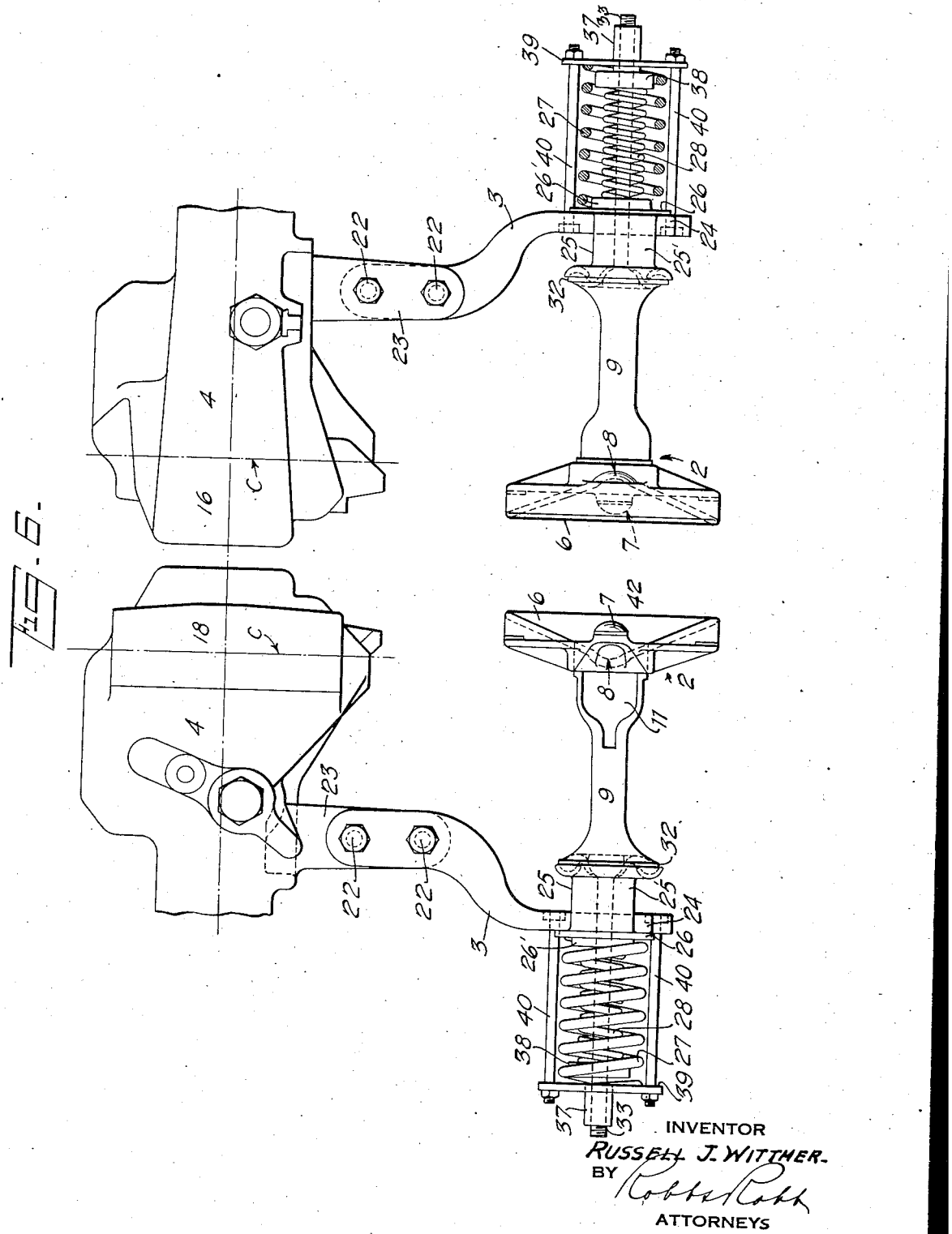
INVENTOR
RUSSELL J. WITTMER.
BY
ATTORNEYS

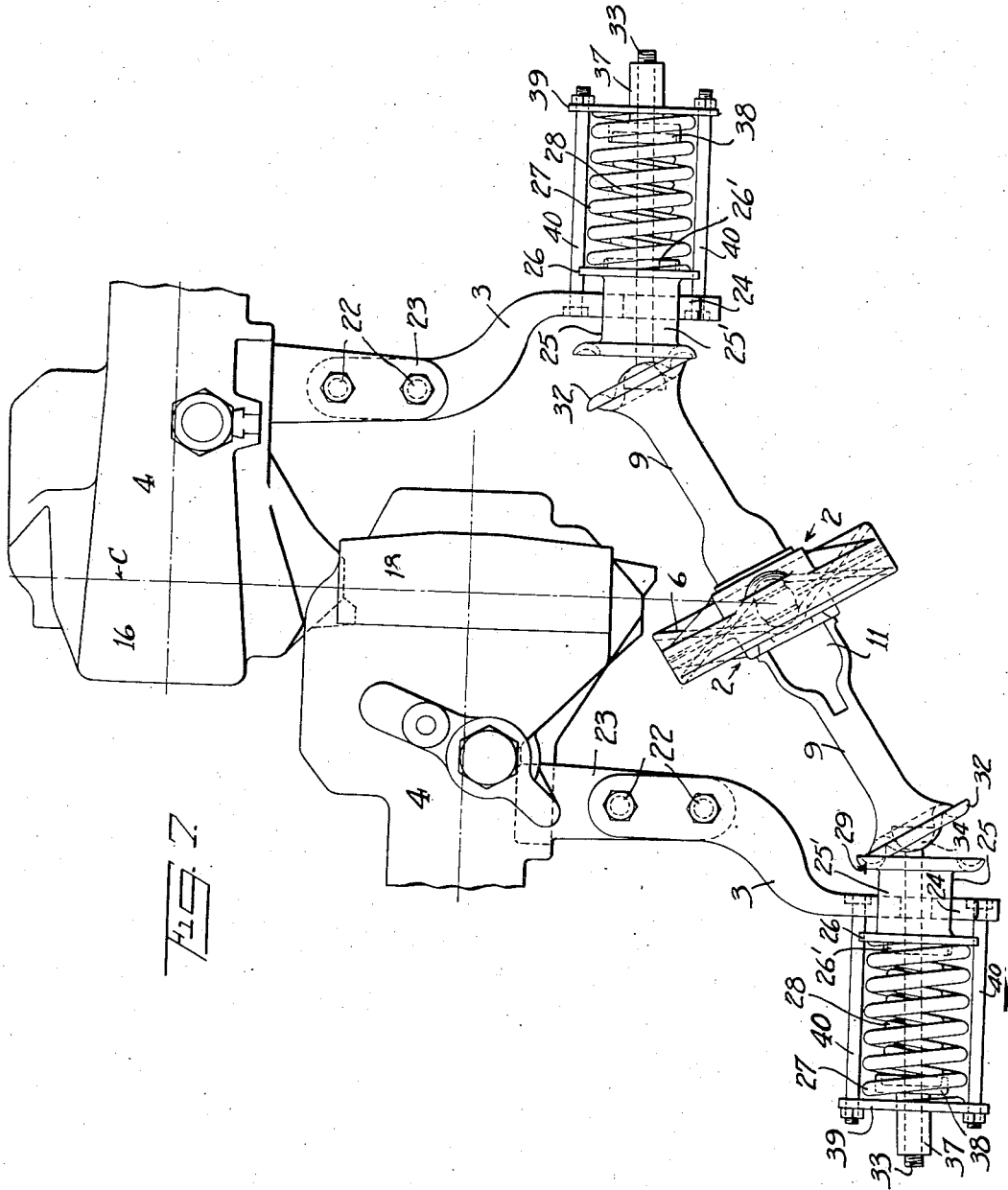

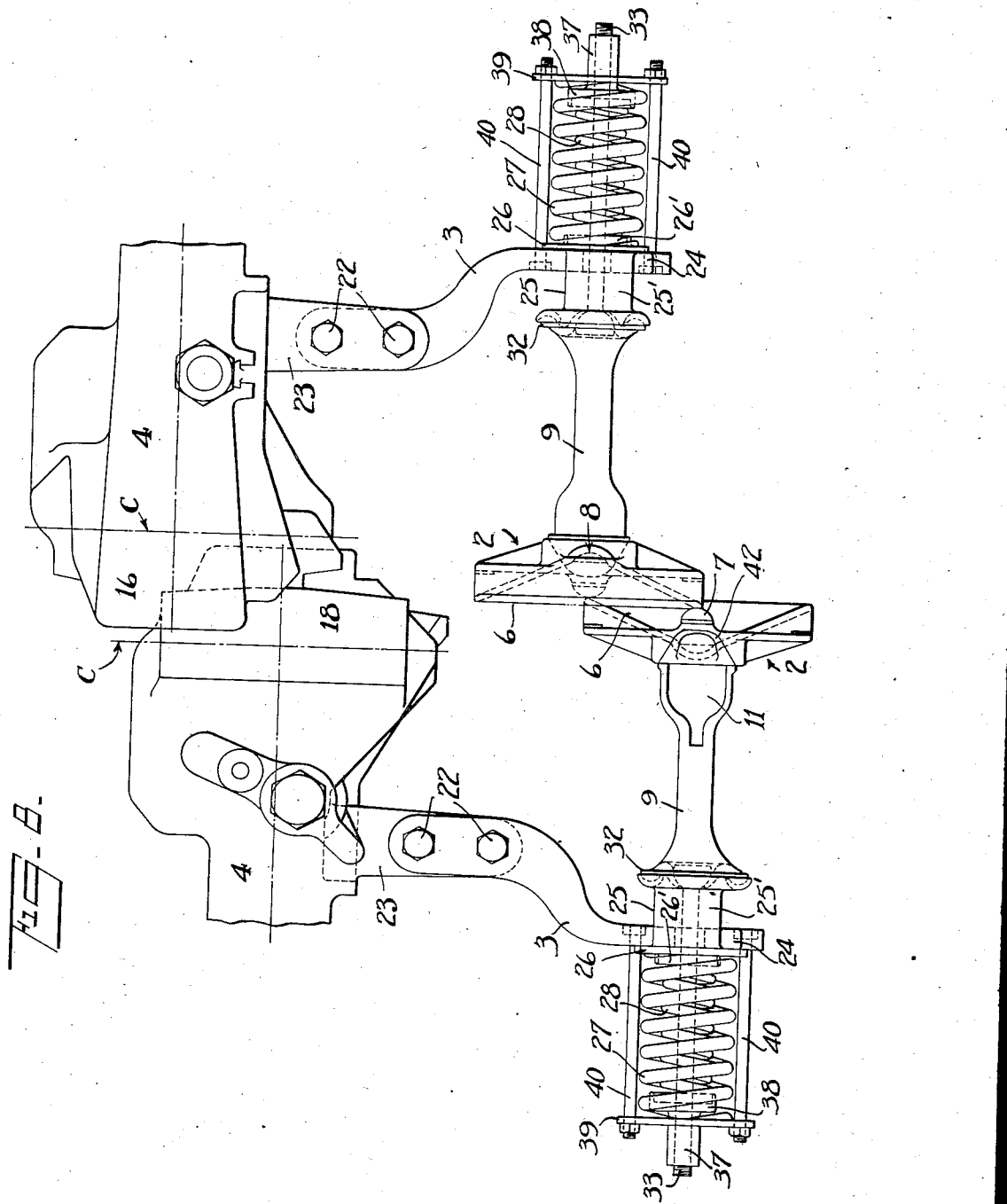

May 19, 1936.　　　R. J. WITTMER　　　2,040,968
AUTOMATIC TRAIN PIPE CONNECTER
Original Filed Jan. 12, 1932　　7 Sheets-Sheet 7
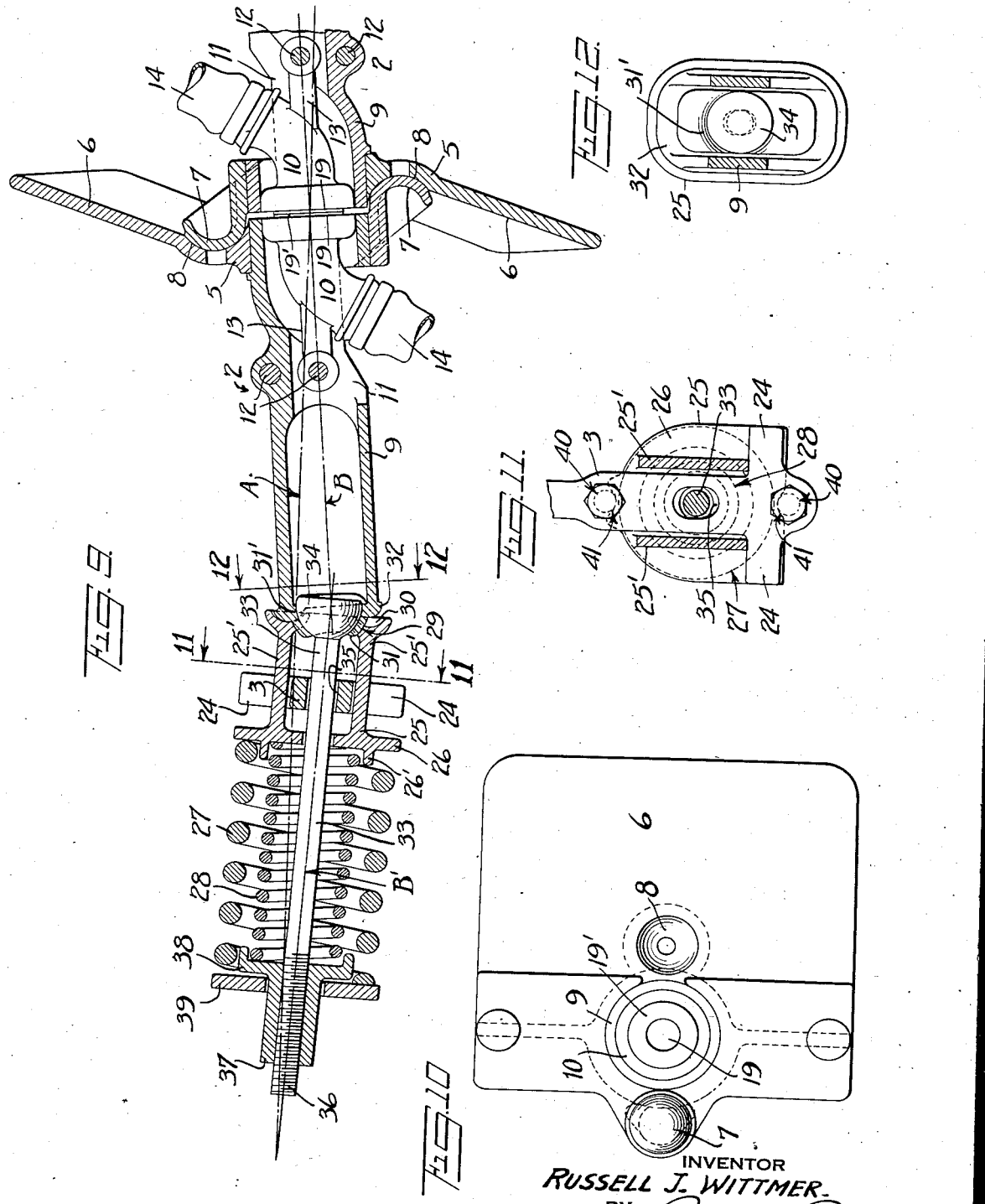
INVENTOR
RUSSELL J. WITTMER.
BY
ATTORNEYS Patented May 19, 1936

2,040,968

UNITED STATES PATENT OFFICE 2,040,968

AUTOMATIC TRAIN PIPE CONNECTER

Russell J. Wittmer, Cleveland Heights, Ohio, assignor, by direct and mesne assignments, of one-half to Joseph Robinson, New York, N. Y., and one-half to Roy M. Wolvin, Montreal, Quebec, Canada Application January 12, 1932, Serial No. 586,227
Renewed May 13, 1935

18 Claims. (Cl. 213—76)

This invention relates, in general, to improvements in the form and arrangement of automatic train pipe connecters whereby the gathering action of the connecters is greatly facilitated and the permissible vertical range of action is increased. As illustrated and described herein the invention is embodied in connecters associated with couplers of the standard Willison type, but the invention may also be associated with other types of couplers. The invention has further been illustrated herein in conjunction with connecters of the pin and funnel type, in which the ball or pin on one connecter head is adapted to be guided by a funnel or inclined surface on the opposing connecter head, so as to bring the connecting ports or ends of the train lines into operative engagement.

It is desirable that the connecter of one car should not be capable of engaging with the connecter of an opposing car in such a way as to foul or damage either connecter, and particularly, means should be taken to prevent the ball, pin or projection of one connecter from entering the air port of another. It has been found that those, and other, difficulties can be overcome by properly positioning the connecters with respect to the couplers. An important feature of this invention is to position the connecters in back of the coupler faces so that the preliminary guiding of the connecters is brought about by the couplers, rather than the connecters themselves. Locating the connecters in this way not only increases the available gathering range of the connecters, but also insures that they will not be brought into contact with each other until aligned to such an extent that their further self-alignment cannot produce any injurious effects. Another important feature involved herein is the disposing of the connecters in an angular relation with respect to the couplers, the centerlines of the connecters being off-set from the coupler centerlines to such an extent that the ball, or projection, of one connecter will not enter the air port of the opposing connecter during coupling of the connecters.

As will be apparent from the description given hereinafter, these arrangements not only overcome defects and disadvantages inherent in other connecters, but they make it possible to use a connecter which is more compact and, at the same time, increase the extent of the gathering range without introducing physical limitations to the connecter. Thus, it will be shown that by permitting the preliminary guiding to be done by the couplers, it is possible to eliminate one of the guiding surfaces usually found in connecters of this type and to reduce the extent of the other guiding surface, thereby reducing the size of the connecter as a whole.

Still another feature of the present invention is the arrangement of the funnel portion of the connecter on the guard arm side of the coupler. Heretofore it has been customary to position the projection or ball of the connecter on the guard arm side of the coupler, with the result that in the event of slip-bys on the lock, or knuckle side of the coupler, the connecters were frequently damaged. The danger of injury to the connecter is reduced by the present arrangement. Furthermore, the ball sides of the connecters are ordinarily much better adapted to ride over one another without injury, in the event of a slip-by, than are the funnel sides.

In accordance with still another feature of this invention the connecter heads are mounted in improved swivel connections in suitable brackets depending from each of the opposing couplers. These mountings permit the connecters to remain in operative engagement through a much greater vertical range of disalignment than has been possible with connecters heretofore devised, and also permit the ball sides of the connecters to pass and repass each other readily in the event of a slip-by and subsequent retraction of the couplers, the connecters swinging about these mountings, first in one direction and then in the other.

Other features will be apparent, and the invention will be better understood, from the description given below, taken in conjunction with the accompanying drawings, in which Figure 1 is a partial plan view of two opposing couplers of the standard Willison type, separated and laterally displaced, so that their centerlines, designated by A, do not coincide; the connecters being below the couplers and located in back of the coupler faces but in front of the coupling lines C, for the purposes described; and the centerlines B of the connecters coinciding;

Figure 4 shows the couplers contacting with each other at the beginning of their aligning action, the preliminary guiding of the connecters continuing during movement of the couplers from the Figure 4 position through that shown in Figure 3;

Figure 5 illustrates the guiding action of the couplers with their lock sides in contact. Further movement of the connecters toward each other will cause the pins of the connecters to be positioned in the accommodating recesses of the opposing connecters. As shown, no guiding surfaces extending from these recesses toward the lock sides of the couplers are necessary, the pins being forced directly into these recesses by the action of the couplers.

Figure 2:
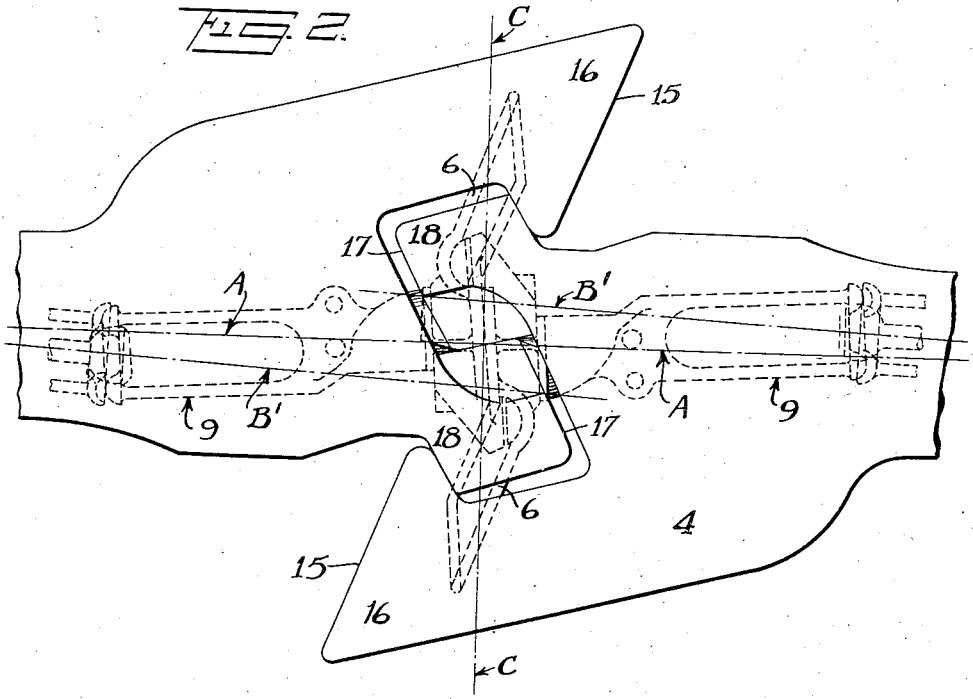
Figure 2 shows the couplers and connecters in operative engagement, the pin of each connecter being positioned in a suitable recess in the opposing connecter.
Figure 3:
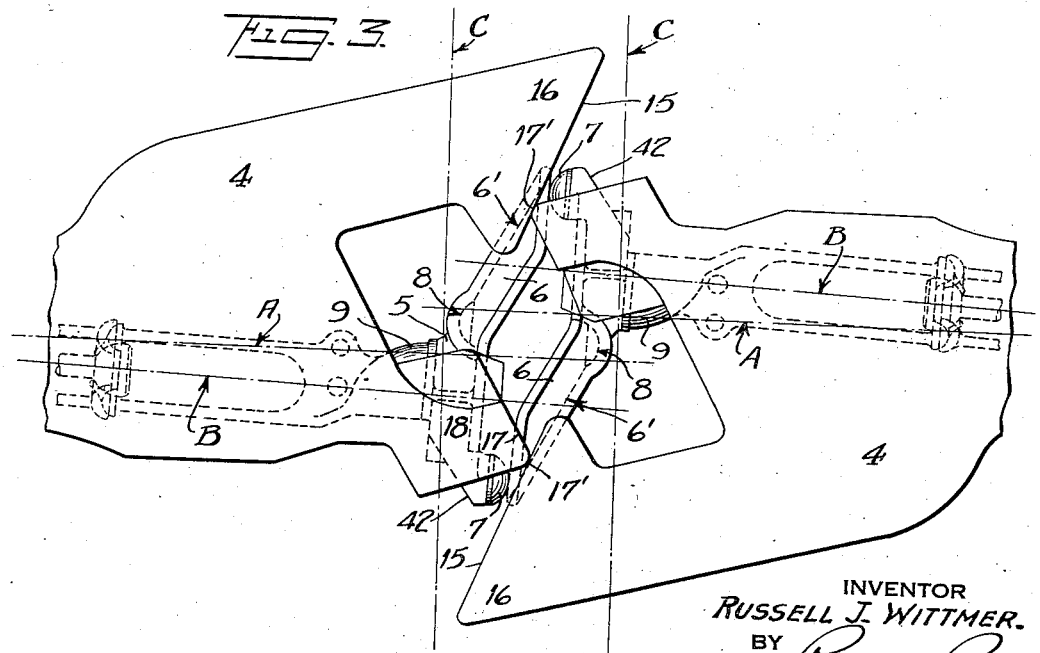
Figure 3 illustrates the preliminary guiding of the connecters through the action of the couplers, representing the position of the connecters just prior to their coming into engagement with each other.

Figure 6 is a side elevation of opposing couplers and connecters showing the relative vertical positions of the connecters with respect to the couplers, together with improved means for supporting the connecters and enabling the connecters to remain in operative engagement with each other despite pronounced vertical disalignment of the couplers;

Figure 7 is a side elevation similar to Figure 6 but illustrating the action of the connecter supporting means under conditions of vertical disalignment of the couplers;

Figure 8 is a side elevation of the couplers and connecters showing the connecters contacting with each other preparatory to aligning themselves into operative engagement during engagement of the couplers while vertically disaligned;

Figure 9 is a horizontal cross-sectional view detail taken through the center line of the connecters and showing in conjunction with one of the connecters the apparatus providing for the pivotal mounting thereof on the supporting bracket, the connecters being shown coupled together as in Figure 2;

Figure 10 is a front view of one of the connecters, showing the relative positions of the funnel, recess, air port and pin;

Figure 11 is a sectional view taken substantially along the line 11—11 of Figure 9, just forward of the connecter supporting bracket, and Figure 12 is a sectional view taken substantially along the line 12—12 of Figure 9.

Referring to the drawings, it will be seen that the connecters, designated generally as 2, are supported by suitable brackets 3 (Figure 6) depending from the couplers 4. Each of the connecters, as shown, comprises a head 5 having a guiding funnel 6 on one side thereof and a rounded projection 7 on the other side thereof; the projection 7 of each connecter being received within a concave seat portion 8 of the funnel 6 of the opposing connecter when the connecters are coupled together, as shown in Figure 9. The head 5 is pressed upon or otherwise secured to a head supporting member or shank 9. Mounted within the shank 9 in any suitable way is a conduit or pipe fitting 10, which at one end fits into the open end of said shank and at its other end extends through an opening 11 in the side wall thereof; said fitting being shown attached to said shank by means well known in the art and comprising a U-shaped latch or pin 12 slidably mounted in said shank and engaging an opening in a stem 13 projecting from said fitting. Each fitting 10 is connected to a train pipe hose 14 on the associated car.

As shown in Figures 1, 3, 4, and 5, each of the connecters is so supported from its associated coupler that when uncoupled from the opposing connecter it extends forwardly of the coupling line C but at the same time lies rearwardly of guiding surfaces on the coupler. Thus, as shown in the views aforesaid, the funnel portion 6 of each connecter is positioned rearwardly of a substantial portion of the forward surface 15 of the jaw 16 corresponding to the guard arm side of the coupler, and the ball or pin 7 is positioned rearwardly of the guiding surface 17 of the jaw 18 at the lock side of the coupler. This arrangement presents the decided advantage that the preliminary guiding of the connecters into alignment with each other is performed by the couplers as will be particularly apparent from the following description.

Referring now to Figure 4, it will be observed that two opposing couplers have just been brought into contact so that the corner surface 17' at the lock side of one coupler abuts against the surface 15 at the guard arm side of the other coupler. As shown, the connecters 2 are separated by approximately twice the distance of their respective set-backs from the faces of the couplers. Now as the couplers are forced toward each other, the lock side surfaces 17' slide along the guard arm side surfaces 15, bringing the couplers closer in alignment so that they will, if this movement be continued, be brought into engagement with each other, as shown in Figure 2. The connecters, being carried by the couplers, are also brought closer in alignment with each other by aforesaid aligning movement of the couplers, as will be apparent by comparing their relative positions in Figure 4 with those illustrated in Figure 3. In this latter figure, the couplers have carried the connecters with them to such an extent that the connecters are opposite one another and a slight further movement will bring the ball or pin 7 of each connecter into contact with the funnel 6 of the opposing connecter. While in Figure 3, the pins 7 at first sight appear to contact the opposing funnels 6, it will be understood that said pins do not actually engage the funnels until they reach the funnel surfaces represented by the inclined dotted lines designated 6' in this figure. If the couplers be further brought together, the pins 7, engaging the guiding surfaces 6' of the funnels 6 (the contour of which surfaces is clearly shown by Figures 6, 9, and 10) will cause the connecters thereafter to move into alignment independently of the couplers until each pin is located in the recess 8, at the apex of the funnel of the opposing connecter. The connecters are now in operative engagement so that the air ports 19 (see Figures 9 and 10) at the ends of the mating fittings 10 are brought together. Since the connecters are located in front of the coupling line of the couplers, the connecters will engage before the couplers are moved into their final positions shown in Figure 2.

When the couplers have been angled so that in approaching each other the surfaces 17 at their lock sides are in contact, each with the other, as shown in Figure 5, it will be seen that said surfaces accomplish the preliminary guiding of the connecters, and continue to guide the latter until the inner corner 20 of one of the jaws 18 slips around the corresponding corner of the other. The couplers are shown in this relative position in Figure 1, although separated somewhat. As has been noted hereinbefore, the centerlines B of the connecters are offset toward the lock sides of the couplers with respect to the coupler centerlines A. This is of particular importance in that it insures that the pins 7 of the connecters will not strike the air ports 19 during the guiding of the couplers into coupling relation by the interengagement of their lock side surfaces 17, 20. This will be particularly clear from Figure 1 from which it will be seen that if the center lines of the connecters coincided with those of the respective couplers, the pin 7 of each connecter would be in alignment with the air port 19 of the opposing connecter with the result that said projection would foul the gasket 19' (Figure 10) in said air port during movement of the couplers into coupled position. However, by positioning the connecters with their center lines offset from the coupler center lines, the projection 7 of each connecter comes directly opposite the recess 8 in the opposing connecter, so that as the couplers move into coupling relation each projection enters the recess 8 provided for receiving it. The air ports are now aligned. As has been pointed out, the connecters are positioned forwardly of the coupling lines C of their respective couplers, with the result that coupling of the connectors is effected before the couplers have moved to their final coupled position indicated in Figure 2.

Since, during the approaching of the couplers with their lock side surfaces 17 in contact with each other, all the guiding of the connecters into alignment is done by the couplers, there is no necessity for providing a guiding surface on the connecter between the recess 8 and the pin 7 of that connecter. The elimination of one guiding surface in this way results in a particularly compact connecter construction and the compactness of the connecter is further increased by the fact that a funnel 6 substantially shortened both longitudinally and laterally may be employed as a result of the preliminary guiding of the connecters by the couplers described in connection with Figures 3 and 4. There results a connecter which is decidedly more compact than has heretofore been developed and in which such compactness is attained without decreasing its effective gathering range of action. Furthermore, as above pointed out, by setting the connecters back and angling them with respect to the couplers, there is no danger of having a pin foul an air port because when the coupler lock sides contact the pin is kept away from the opposing connecter until it is inserted into the cooperating recess 8.

The means employed for supporting the connecters below the couplers are illustrated in Figures 6 to 9, inclusive, and 11 and 12. Each bracket 3 is bolted or otherwise secured, as indicated at 22 to a projection 23 on the coupler. The lower end of the bracket 3 is provided with laterally extending projections 24 which support a member 25, shown more clearly in Figures 9 and 11, and comprising parallel side portions 25', the lower edges of which rest upon the bracket projections 24. At the rear end of these side portions 25' and preferably formed integral therewith is a plate 26 having an annular flange 26' on its rear face adapted to accommodate the springs 27 and 28, as shown. The forward end of the member 25 is provided with an inner annular concave surface 29 and an outer concave seat 30, the latter extending entirely around the former. These surfaces are adapted to accommodate corresponding curved projections 31 and 32, respectively, on the rear end of the connecter supporting member or shank 9.

The two members 9 and 25, are urged toward each other so as to remain in contact by means of the following apparatus. A rod 33 extending through the socket member 25, and projecting a substantial distance rearwardly of that member, is provided at its forward end with a partially spherical projection or ball 34, which contacts with the inner surface 31' of the ball connection 31 on the end of the connecter shank member 9. This ball 34 enables the connecter shank 9 to turn freely with respect to the rod 33, and sufficient clearance 35 is provided in the bracket 3 to permit relative angular movement between the rod 33 and connecter shank 9 as the latter assumes different angular positions. The rear end of the rod 33 is threaded as shown at 36 and screwed thereupon is a retaining member 37 provided with an enlarged annular flange 38 adapted to receive the end of the spring 28. Since the forward end of this spring abuts against the plate 26, which cannot move forward because of the bracket 3, the compression in this spring 28 will tend to force the retaining member 37 rearwardly and, through the action of rod 33 and the ball 34 thereon, will urge the connecter shank 9 rearwardly toward the bracket 3, maintaining said shank seated upon the member 25. The compression of the spring 28 may be varied by changing the position of the retaining member 37 upon the threaded rod 33. As will be clearly seen from Figure 9, turning of the connecter shank 9 in any direction will result in the exertion of a torque or leverage thereon by the head 34 of rod 33, urging said shank about the surface 32, engaged by cooperating projection 30, as a fulcrum, into centralized position with respect to member 25.

Figure 1:
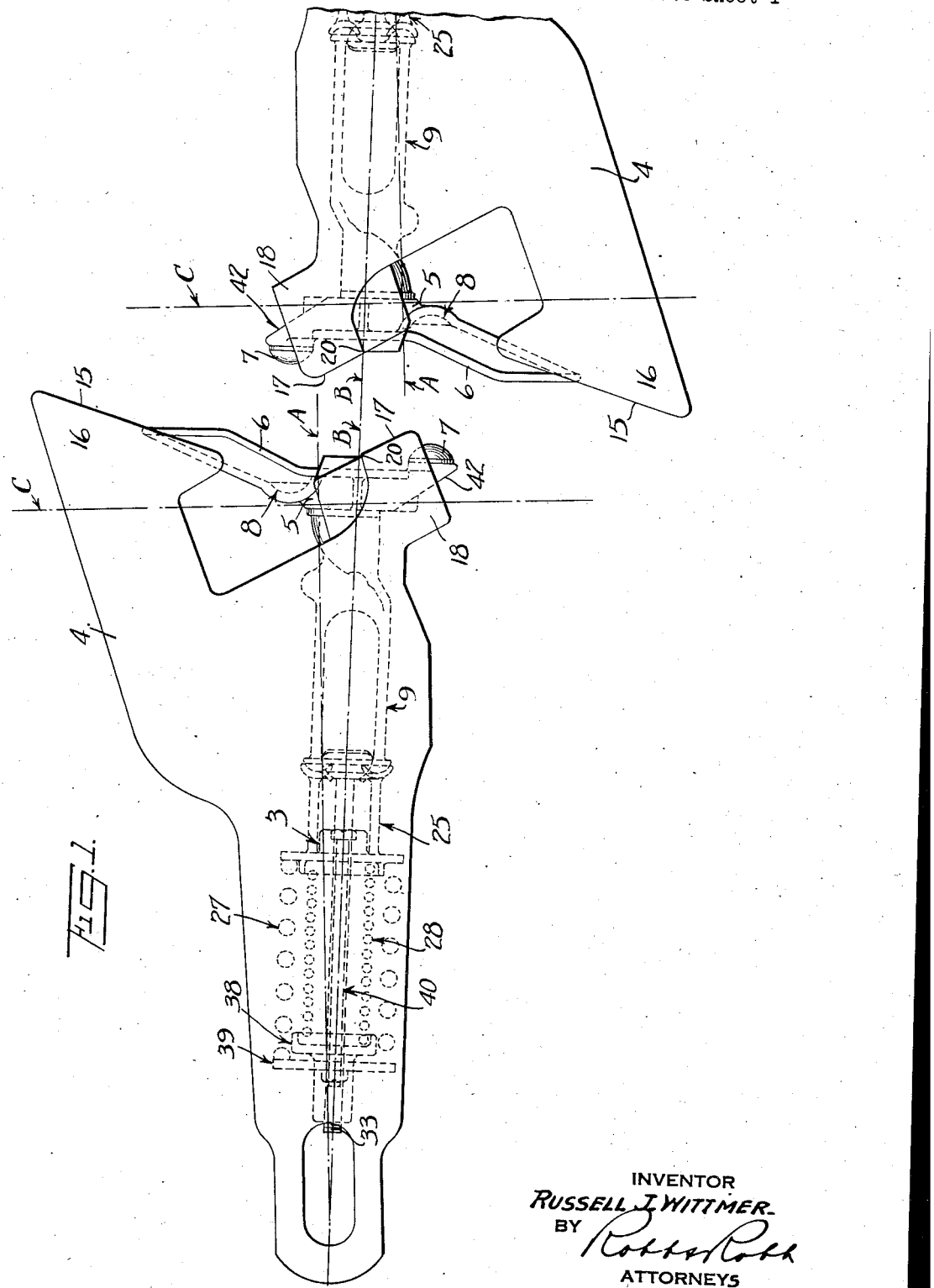

The member 25 having the sockets 29 and 30 is urged forward against the rear side of the bracket 3 by the spring 27, the forward end of which abuts against the plate 26. The rear end of this spring abuts against a plate 39 which is slidably mounted upon the hub of the retaining member 37. This plate is prevented from moving rearwardly beyond the position shown in Figures 6–9 by means of the bolts 40 connected to the bracket 3 and passing through grooves 41 in the plate 26 (see Figure 11), whereby the socket member 25 is guided by the bolts during movements of this member relatively to the bracket 3. Since the plate 39 cannot move rearwardly beyond its positions shown in Figures 6–9, the compression in the spring 27 acting upon the plate 26 urges the socket member 25 constantly forwardly. When the associated connector is out of engagement with a mating connecter, the plate 26 is forced against the rear side of the bracket 3 as indicated in Figures 1 and 6. When the connecters are brought into engagement with each other, however, and the couplers continue their movement into coupled position, the plates 26 of the supporting apparatus for said connecters are moved away from the respective brackets 3 against the action of the springs 27; the positions of said plates with respect to said brackets when the connecters are fully coupled together being indicated in Figures 7 and 9.

As shown clearly in Figures 1 and 9, the bracket 3 is so angled with respect to the center line A of the coupler, and the bolts 40 are similarly so angled that the longitudinal axis of the support comprising the members 25, 33, 38, 39 is substantially that designated by the line B in Figure 1. This axis coincides with the longitudinal axis of the connecter when the latter is uncoupled from a mating connecter, as indicated in Figure 1. When, however, said connecter is engaged with a mating connecter, said connecter is angled about the head 34 of rod 33 and its axis B is angled both with respect to the longitudinal axis B' (Figures 2 and 9) of said support and with respect to the longitudinal axis of the coupler, as shown in Figure 9. The spring 28, acting through rod 33 and head 34 upon portion 31 of the connecter shank 9, constantly urges said connecter into alignment with member 25, and with projections fully engaged with the corresponding curved seats 29, 30 of said member.

The funnels 6 of the connecters are adapted to guide the opposing connecters both vertically and horizontally at the same time. Since, however, there is no vertical guiding by the couplers, such guiding must be done entirely by the connecters themselves, whereas a large portion of the horizontal guiding is performed by the couplers. The universal joint arrangement above described for pivotally mounting the connecter heads upon the coupler brackets permits a particularly wide range of pivotal movement of the connectors vertically, each of said connecters being free to angle vertically about head 34 in seat 29 as shown in Figure 7. Figure 8 shows the connecters about to couple when the couplers are disaligned vertically to a marked degree; while in Figure 7 the coupled connecters, due to the aforesaid universal joint construction, are enabled to remain in operative engagement notwithstanding still greater vertical disalignment of the couplers. The hereinbefore described joint arrangement for pivotally mounting the connecter heads upon the coupler brackets attains the result of decidedly increased range of vertical action of the connecters and permits the connecters to remain operatively connected together through a much greater vertical disalignment of the couplers than has heretofore been possible without increasing the amount of initial forward projection of the connecters.

It may be more particularly pointed out in this connection that in the arrangement herein disclosed provision is made for a connecter, in moving upwardly in response to relative vertical displacement of the couplers, to pivot about a point above the connecter center line, and for the mating downwardly moving connecter to tilt about a pivot below its center line. Thus, in Figure 7, the upwardly moving or left hand connecter has turned about a portion of surface 29 above its centerline, while the right hand connecter has turned downwardly about an axis below its center line. The mating connecters are thereby enabled to remain in the appropriate relation to the coupling line C so that separation of said connecters will not occur notwithstanding vertical angling in response to extreme and unusual relative vertical displacement of the couplers. The connecters thus remain in coupled relation while angling vertically through a decidedly increased range as compared with prior arrangements. It may be noted further that even with the extreme vertical displacement of the couplers with respect to each other in Figure 7, the forward travel of each connecter mounting has not been entirely utilized and that the connecters could in fact angle still further vertically without separating, until flanges 26 of members 25 contact with the rear faces of the associated brackets 3.

It will be noted that in the arrangement herein disclosed the funnel 6 of each connecter is positioned beneath the guard arm side of the coupler from which it is supported. The connecters are thereby protected against the damage which would otherwise be likely to result when the lock side of one coupler slips by the lock side of the other. When connecters of the pin and funnel type are mounted with their funnels beneath the lock sides of the respective couplers, as has heretofore been proposed, serious damage to the connecters may be caused during slip-bys on the lock sides, such slip-bys being frequently of very substantial extent and the connecters being prevented from slipping by each other or following the movements of the couplers by the engagement of the funnel of one with the funnel of the other. With the arrangement shown herein, however, the pins 7 of the connecters lie below the lock sides of the respective couplers, with the result that during slip-bys the pins instead of the funnels of the connecters engage each other, the connecters merely being angled about the seats 30 of the respective supporting members 25 during the engagement of said pins, and the latter readily passing by each other. When the couplers are subsequently retracted the rear inclined surfaces 42 of the connecters engage each other and the connecters are thereby readily swung about seats 30 of their associated supporting members 25 to positions wherein they can freely pass each other during said retraction of the couplers.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. In combination, a car coupler, an automatic train pipe connecter having an air port carried thereby and comprising pin and funnel members adapted to bring said connecter into operative engagement with a mating connecter, the funnel of said connecter being positioned adjacent the guard arm side of said coupler and the pin adjacent the opposite side thereof, said connecter being off-set laterally with respect to the coupling line of said coupler to prevent the pin thereof from engaging the air port of the mating connecter.

2. In combination, a car coupler, an automatic train pipe connecter having an air port carried thereby and comprising pin and funnel members adapted to bring said connecter into operative engagement with a mating connecter, said pin and funnel members being rearwardly disposed with respect to guiding surfaces on said coupler, the funnel of said connecter being positioned adjacent the guard arm side of said coupler and the pin adjacent the opposite side thereof, said connecter being offset laterally with respect to the coupling line of said coupler to prevent the pin thereof from engaging the air port of the mating connecter.

3. In combination, an automatic train pipe connecter comprising a head portion and a shank portion, means for supporting said connecter for horizontal and vertical angling comprising a bracket depending from a car coupler, a member slidably mounted on said bracket and having a plurality of curved portions engageable with corresponding curved portions on said shank, a rod slidably mounted in said bracket and said member and having a curved forward head engaging a curved seat on said shank, spring means cooperating with said member and said rod for constantly urging said shank into engagement with said curved portions of said member, and spring means cooperating with said member for urging the latter forwardly.

4. In combination, an automatic train pipe connecter comprising a head portion and a shank portion, means for supporting said connecter for horizontal and vertical angling comprising a bracket depending from a car coupler, a member slidably mounted on said bracket and having a curved portion engageable with a corresponding curved portion of said shank, a rod slidable with respect to said member and having a curved forward head engaging a curved portion of said shank, and spring means cooperating with said rod for urging said shank into engagement with said member and said member into a given relation to said bracket.

5. In combination, an automatic train pipe connecter comprising a head portion and a shank portion, means for supporting said connecter for horizontal and vertical angling, a member slidably mounted on said means and having a curved seat on the forward end thereof engageable with a corresponding curved portion on the rear end of said shank, a rod extending through said member and having a curved forward head engaging a curved seat on said shank, spring means cooperating with said rod for urging said shank into engagement with said seat on said member, and other spring means cooperating with said member for urging the latter into a given relation to said bracket.

6. In combination, an automatic train pipe connecter comprising a head portion and a shank portion, a bracket for supporting said connecter for horizontal and vertical angling, a member slidably mounted on said bracket and having a curved seat on the forward end thereof engageable with a corresponding curved portion on the rear end of said shank, a rod extending through said member and having a curved forward head engaging a curved seat on said shank, spring means cooperating with said rod for urging said shank into engagement with said seat on said member, other spring means cooperating with said member for urging the latter into a given relation to said bracket, and guiding means for said member extending rearwardly from said bracket.

7. In combination, an automatic train pipe connecter comprising a head portion and a shank portion, a bracket for supporting said connecter for horizontal and vertical angling, a member slidably mounted on said bracket and having a curved seat on the forward end thereof engageable with a corresponding curved portion on the rear end of said shank, a rod extending through said member and having a curved forward head engaging a curved seat on said shank, spring means cooperating with said rod for urging said shank into engagement with said seat on said member, other spring means cooperating with said member for urging the latter into a given relation to said bracket, guiding means for said member projecting rearwardly from said bracket, and an element mounted on said guiding means and forming a seat for said other spring means.

8. In combination, an automatic train pipe connecter comprising a head portion and a shank portion, a bracket for supporting said connecter for horizontal and vertical angling, a member slidably mounted on said bracket and having a curved seat on the forward end thereof engageable with a corresponding curved portion on the rear end of said shank, a rod extending through said member and having a curved forward head engaging a curved seat on said shank, spring means cooperating with said rod for urging said shank into engagement with said seat on said member, other spring means cooperating with said member for urging the latter into a given relation to said bracket, guiding means for said member projecting rearwardly from said bracket, an element mounted on said guiding means and forming a seat for said other spring means, and a spring seat member receiving one end of the first mentioned spring means and slidably mounted in said element, said spring seat member being secured to said rod and said first mentioned spring means being interposed between said spring seat member and said first mentioned member.

9. In combination, an automatic train pipe connecter comprising a head portion and a shank portion, a bracket for supporting said connecter for horizontal and vertical angling, a member slidably mounted on said bracket and having a curved seat on the forward end thereof engageable with a corresponding curved portion on the rear end of said shank, a rod extending through said member and having a curved forward head engaging a curved seat on said shank, spring means cooperating with said rod for urging said shank into engagement with said seat on said member, and other spring means cooperating with said member for urging the latter into a given relation to said bracket, one of said spring means surrounding the other of said spring means.

10. In combination, an automatic train pipe connecter comprising a head portion and a shank portion, a bracket for supporting said connecter for horizontal and vertical angling, a member slidably mounted on said bracket and having a curved seat on the forward end thereof engageable with a corresponding curved portion on the rear end of said shank, a rod extending through said member and having a curved forward head engaging a curved seat on said shank, spring means cooperating with said rod for urging said shank into engagement with said seat on said member, and other spring means cooperating with said member for urging the latter into a given relation to said bracket, said supporting means being so disposed with respect to the longitudinal axis of the coupler as to support said connecter in offset relation to said axis.

11. In combination, a car coupler having a lock side portion for cooperating with a mating lock side portion of another coupler for aligning purposes, and comprising a guard arm portion, an automatic train pipe connecter comprising an intermediate portion having an opening for receiving a train line conduit, a projection at one side of said opening and a funnel having a concave seat at the other side of said opening, said seat lying immediately adjacent said intermediate portion, and said funnel having an extension flaring away from said seat for guiding the projection of a mating connecter into said seat when the connecters are disaligned in one lateral direction, and means supporting said first mentioned connecter from said coupler with said projection and funnel rearwardly displaced with respect to the lock side and guard arm portions for enabling the couplers to effect a preliminary alignment of the connecters when disaligned in the aforesaid lateral direction and complete alignment of said connecters by means of the lock side portions of the couplers when disaligned in the opposite lateral direction.

12. A train pipe connecter and support therefor, which comprises, in combination, a connecter head having a guide surface, a spherical recess in said guide surface, a pin having a convex head, an air port, a shank, a carrier, a universal connection between said shank and said carrier, and means for resiliently urging said carrier in one direction in a zone removed from the longitudinal axis of the carrier, and a second resilient means for urging the shank into engagement with the carrier.

13. In combination, an automatic train pipe connecter comprising a head portion and a shank portion, means for supporting said connecter for horizontal and vertical angling comprising a bracket depending from a car coupler, a member slidably mounted on said bracket and having a curved portion engageable with a corresponding curved portion of said shank, a rod slidable with respect to said member and having a curved forward head engaging a curved portion of said shank, and spring means cooperating with said rod for urging said shank into engagement with said member and said member into a given relation to said bracket, said supporting means being so angled with respect to the coupler that the longitudinal axis of said member extends at an angle to the longitudinal axis of said coupler.

14. In combination with a pair of car couplers each having lock side and guard arm portions, said lock sides adapted to align and to guide said couplers to interlocked position, a pair of automatic train pipe connecters carried by the said couplers and offset angularly with relation thereto, each of said connecters including a pin and funnel, and being provided with an air port arranged between said pin and funnel, a recess in said funnel forming a seat for the reception of the pin when the said connecters are in operative engagement, said connecters being so positioned relative to the couplers that when the couplers are brought into engagement with their lock sides performing the alignment, the pin of the connecter is inserted in the recess of the opposing connecter without first contacting with any other portion of the connecter, thereby preventing the pin from entering the opposing air port during angular displacement of the connecter.

15. In combination with a pair of car couplers, including lock side and guard arm portions having guiding means, said lock side and guard arm portions being adapted to align and to guide said couplers to interlocked positions, a pair of automatic train pipe connecters carried by the said couplers and movable for vertical and horizontal angling with respect thereto, each connecter comprising a body portion, a head on said body portion provided with horizontal and vertical guiding means and a coupling face, said head being offset laterally with respect to the longitudinal axis of its cooperating coupler for locating the coupling face of the connecter head beneath the lock side portion of its cooperating coupler, said vertical and horizontal guiding means extending from rearwardly of the guiding means of the lock side portion of said last mentioned coupler for permitting spaced partial horizontal alignment of the connecter with its mating connecter upon alignment of its supporting coupler with its mating coupler, and thereby upon subsequent engagement of the connecter head with its mating connecter to move, the coupling face and the forward end of the body portion of each connecter laterally from under the lock side portion of its cooperating coupler until their center line and longitudinal axis and the coupling line of the coupler intersect in a common vertical plane.

16. The combination of a pair of couplers with connecters as set forth in claim 15, wherein each connecter has guiding means of different longitudinal extent.

17. The combination of a pair of couplers with connecters as set forth in claim 15, wherein each connecter has guiding means of different lateral extent.

18. The combination of a pair of couplers with connecters as set forth in claim 15, wherein horizontal guiding means of the connecter and the guiding means of the guard arm portion of its cooperating coupler are substantially parallel with respect to each other and disposed on the same side of the center line of the coupler.

RUSSELL J. WITTMER.

CERTIFICATE OF CORRECTION.

Patent No. 2,040,968.  May 19, 1936.

RUSSELL J. WITTMER.

It is hereby certified that error appears in the printed specification of the above numbered patent requiring correction as follows: Page 6, second column, line 22, claim 15, for the word "its" read the; and that the said Letters Patent should be read with this correction therein that the same may conform to the record of the case in the Patent Office.

Signed and sealed this 18th of August, A. D. 1936.

Henry Van Arsdale
Acting Commissioner of Patents.

(Seal)